United States Patent [19]

Kanaoka et al.

[11] Patent Number: 5,585,018
[45] Date of Patent: Dec. 17, 1996

[54] LASER CUTTING METHOD ELIMINATING DEFECTS IN REGIONS WHERE CUTTING CONDITIONS ARE CHANGED

[75] Inventors: Masaru Kanaoka; Homare Mori; Takayuki Yuyama, all of Aichi; Shozui Takeno, Hyogo, all of Japan

[73] Assignee: Mitsubishi Denki Kabushiki Kaisha, Tokyo, Japan

[21] Appl. No.: 392,524

[22] Filed: Feb. 23, 1995

[30] Foreign Application Priority Data

Feb. 24, 1994 [JP] Japan ..................................... 6-26980

[51] Int. Cl.⁶ .................................................. B23K 26/08
[52] U.S. Cl. ........................... 219/121.72; 219/121.61; 219/121.67; 219/121.8; 219/121.84
[58] Field of Search .................... 219/121.61, 121.62, 219/121.67, 121.7, 212.71, 121.72, 121.79, 121.8, 121.81, 121.84

[56] References Cited

U.S. PATENT DOCUMENTS

| | | | |
|---|---|---|---|
| 4,638,145 | 1/1987 | Sakuma et al. | 219/121.78 |
| 5,182,434 | 1/1993 | Nakata | 219/121.72 |
| 5,252,805 | 10/1993 | Nakata et al. | 219/121.72 |
| 5,293,024 | 3/1994 | Sugahara et al. | 219/121.67 |
| 5,444,211 | 8/1995 | Nakata et al. | 219/121.67 |
| 5,449,881 | 9/1995 | Nakata et al. | 219/121.67 |

FOREIGN PATENT DOCUMENTS

| | | | |
|---|---|---|---|
| 60-127775 | 7/1985 | Japan . | |
| 60-137585 | 7/1985 | Japan | 219/121.72 |
| 61-74795 | 4/1986 | Japan . | |
| 61-123489 | 6/1986 | Japan | 219/121.67 |
| 61-154783 | 7/1986 | Japan | 219/121.72 |
| 61-189887 | 8/1986 | Japan . | |
| 61-189893 | 8/1986 | Japan . | |
| 61-232085 | 10/1986 | Japan . | |
| 62-176695 | 8/1987 | Japan . | |
| 62-238092 | 10/1987 | Japan . | |
| 63-63593 | 3/1988 | Japan . | |
| 63-268585 | 11/1988 | Japan . | |
| 1-202387 | 8/1989 | Japan . | |
| 1-205891 | 8/1989 | Japan . | |
| 2-30388 | 1/1990 | Japan . | |
| 2-179373 | 7/1990 | Japan . | |
| 2-303695 | 12/1990 | Japan . | |
| 3-57579 | 3/1991 | Japan . | |
| 3-94987 | 4/1991 | Japan . | |
| 3-106583 | 5/1991 | Japan . | |
| 4-158995 | 6/1992 | Japan . | |
| 4-237582 | 8/1992 | Japan . | |
| 5-5277 | 1/1993 | Japan . | |
| 5-277773 | 10/1993 | Japan . | |

*Primary Examiner*—Teresa J. Walberg
*Assistant Examiner*—Gregory L. Mills
*Attorney, Agent, or Firm*—Sughrue, Mion, Zinn, Macpeak & Seas

[57] ABSTRACT

A laser cutting method with which cutting faults at the time of cutting condition changing are substantially eliminated. Impingement of the laser beam on the workpiece is stopped when the laser beam reaches a position along the path where the first cutting conditions are to be changed to second cutting conditions. The laser beam is then retracted along the path a predetermined distance from the position where the first cutting conditions are to be switched to the second cutting conditions. After a delay time, the laser beam is again moved along the predetermined path to cut the workpiece under the second cutting conditions. The retraction distance is set in accordance with the thickness of the workpiece. Also, an assist gas may be sprayed on the workpiece in the vicinity of the cutting path while impingement of the beam is stopped.

22 Claims, 16 Drawing Sheets

(1)[CUTTING UNDER CONDITIONS 1]

(2)[CUTTING UNDER CONDITIONS 1]

(3)[IMPINGEMENT STOP]

(4)[RETRACTION]

(5)[RETRACTION BY DISTANCE 1]

(6)[IMPINGEMENT UNDER CONDITIONS 2]

(7)[CUTTING UNDER CONDITIONS 2]

POINT B   POINT A

- POINT A
- POINT B

```
       G01X_Y_ G41
① G01X_Y_
   M121   ← BEAM OFF
② G00X_Y_ G42  ← COMPENSATION REVERSED
   M10_   ← CONDITION SWITCHING
   M120   ← BEAM ON
③ G01X_Y_ G41  ← COMPENSATION RESTORED
```

POINT A

POINT B    POINT A

LASER CUTTING METHOD ELIMINATING DEFECTS IN REGIONS WHERE CUTTING CONDITIONS ARE CHANGED

BACKGROUND OF THE INVENTION

The present invention relates to a laser cutting method which utilizes the energy of a laser beam to cut various materials, and more particularly, to a laser cutting method effective for preventing deterioration of the cut surface of a workpiece due to changes in cutting conditions and for preventing degradation of the cutting quality of the workpiece when the cutting conditions are changed during laser cutting.

Cutting conditions are often changed during laser cutting of a sharp corner or the like, which is difficult to cut well under conditions of high speed and high output (hereinafter referred to as "first cutting conditions") used for ordinary straight cutting. Conventionally, to cut a sharp corner or the like, the cutting conditions were changed to those of low speed and low output (hereinafter referred to as "second cutting conditions") under which only a range of several millimeters before and after the corner could be cut well without interruption of laser impingement.

FIG. 25 illustrates such a conventional cutting method and shows a cutting path employed with a cutting condition changing method such as that disclosed in Japanese Laid-Open Patent Publication No. Sho. 63-63593. In this conventional approach, as shown in FIG. 25, a workpiece is first cut under the first cutting conditions, which are then changed to the second cutting conditions at point A on the cutting path with laser impingement maintained, and a corner is cut under the second cutting conditions, which are then changed back to the first cutting conditions at point B on the cutting path.

FIG. 26 shows another conventional approach disclosed in Japanese Laid-Open Patent Publication No. Hei. 2-30388. In this approach, the cutting speed under the second cutting conditions is changed in stages, i.e., 10%, 20%, 40%, 60% and 100% of the cutting speed under the first cutting conditions, during time period T at intervals T1, T1+T2, T1+T2+T3, and T1+T2+T3+T4 in returning from the second cutting conditions to the first cutting conditions.

FIG. 27 illustrates another cutting method, showing an example of switching conditions on only one side of a corner, as disclosed in Japanese Laid-Open Patent Publication No. Sho. 60-127775 and Japanese Laid-Open Patent Publication No. Hei. 5-277773. In this method, the first cutting conditions are used for cutting up to T2 at the point of the corner, the second cutting conditions are used for cutting between T2 and Tp, and the first cutting conditions are used again for cutting from T3.

As yet another example of a conventional approach, Japanese Laid-Open Patent Publication No. Hei. 3-106583 discloses a corner cutting method in which, after laser cutting is conducted up to a corner, a cooling medium is injected for a preset period of time to cool the workpiece, and cutting is then resumed.

However, when the cutting condition changing method shown in FIG. 25 was carried out, as shown in FIG. 21, chipping, gouging or the like of a part of a workpiece in the cut surface of the workpiece tends to occur near point A where the cutting conditions are changed, resulting in a degraded cutting quality of the cut product. The causes of such a problem are sudden changes in cutting speed, cutting laser output, etc., due to the changes in cutting conditions during cutting, and the resultant disturbance of the flow of the cutting gas (gas injected in the direction of the same axis as the laser beam for such purposes such as removal of a molten area from the workpiece and acceleration of an oxidative combustion reaction in laser cutting). Also, heat concentration near the cut surface of the workpiece due to laser cutting is a factor in the increase of such gouging.

FIG. 21 is a sectional view showing the state of cutting after the conditions have been changed at point A during cutting. In this drawing, reference numeral 1 indicates a laser beam and 3 denotes a workpiece. Generally, when conditions are changed during cutting, chipping occurs at the position where the conditions were changed. This is caused by the deviation of the actual cutting position at the position of impingement of the laser beam (deviation "m" in FIG. 21), resulting in abnormal combustion at the point where the cutting conditions are changed. Hence, it is expected that no gouging is produced at point B where the cutting condition switching position occurs at a point prior (retraction distance "l") from the deviation "m", as shown in FIG. 22. FIG. 23 indicates deviations "m" produced when soft steel materials 12 mm and 19 mm thick were cut with the cutting speed changed. As described above, deviations "m" depend on material thickness and cutting speed. The cutting conditions of the above materials are indicated in Tables 1(A) and 1(B).

TABLE 1 (A)

| Conditions for 12 mm Thickness | | |
| --- | --- | --- |
| Speed (m/min) | Output (W) | Other Conditions |
| 0.4 | 700 | Cutting lens: f10" |
| 0.6 | 1000 | Assist gas pressure 0.7 kg/cm$^2$ |
| 0.8 | 1400 | Focal position: +1.5 mm |
| 1.0 | 1800 | |
| 1.2 | 2300 | |

TABLE 1 (B)

| Conditions for 19 mm Thickness | | |
| --- | --- | --- |
| Speed (m/min) | Output (W) | Other Conditions |
| 0.4 | 1000 | Cutting lens: f10" |
| 0.6 | 1400 | Assist gas pressure 0.7 kg/cm$^2$ |
| 0.8 | 1800 | Focal position: +1.5 mm |
| 1.0 | 2400 | |
| 1.2 | 2900 | |

The other primary cause of chipping is uneven heat distribution in the periphery of a cut groove during cutting. As the ambient temperature of the cut groove is higher at the time changing the cutting conditions, the heat conduction is greater, leading to a higher probability of abnormal combustion. In FIG. 24, reference numeral 2 designates a cut groove and reference numeral 1 represents a laser beam. A temperature distribution shown in FIG. 24 is produced around the cut groove. A cutting fault is likely to occur under such conditions, especially at a temperature of not less than approximately 500° C. As the workpiece becomes thicker, the ambient temperature is higher and more time is required for cooling.

In the case of materials other than soft steel, melting faults do not generally occur at the condition changing position. In the case of soft steel, however, melting faults can easily occur at the condition changing position. The oxidation reaction of the soft steel material is indicated by the following reaction equations (or their combination):

$$Fe + \tfrac{1}{2}O_2 \rightarrow FeO + 64.0 \text{ kcal} \quad (1)$$
$$2Fe + \tfrac{3}{2}O_2 \rightarrow Fe_2O_3 + 190.7 \text{ kcal} \quad (2)$$
$$3Fe + 2O_2 \rightarrow Fe_3O_4 + 226.9 \text{ kcal} \quad (3)$$

Thus, excessive heat is generated, in addition to the energy of the laser beam, and hence melting faults occur. In the case of nonferrous metals, however, there is no significant heat of reaction, and thus melting faults do not occur.

In the conventional approach shown in FIG. 26, high quality is achieved when a relatively thin, e.g., 6 mm or less, workpiece is cut at low speed, e.g., 1 m/min or less, but as the workpiece becomes thicker and the cutting speed higher, a cutting fault is more likely to occur at the point where the conditions are changed.

Further, the conventional approach shown in FIG. 27 is effective for preventing a molten portion of a corner from dropping away due to chipping caused by cutting deviation and accumulated heat decreases due to cutting conditions of low speed and low output between T2 and Tp. However, molten area dropping, as described with regard to FIG. 21, occurs at the condition changing position Tp, reducing the cutting quality as a whole.

SUMMARY OF THE INVENTION

It is accordingly an object of the present invention to overcome the above-discussed problems by providing a laser cutting method with which cutting faults at the time of cutting condition changing are substantially eliminated.

The above and other objects of the invention are met by a method for cutting a workpiece with a laser beam utilizing a plurality of cutting conditions including steps of moving a laser beam along a predetermined path to cut a workpiece under first cutting conditions, stopping impingement of the laser beam on the workpiece when the laser beam reaches a position along the path where the first cutting conditions are to be changed to second cutting conditions, retracting the laser beam along the predetermined path a predetermined distance from the position where said first cutting conditions are to be switched to the second cutting conditions, and resuming moving the laser beam along the predetermined path to cut the workpiece under the second cutting conditions. The retraction distance is preferably set in accordance with the thickness of the workpiece. Also, an assist gas may be sprayed on the workpiece in the vicinity of the cutting path while impingement of the beam is stopped.

DESCRIPTION OF THE PREFERRED EMBODIMENTS

Embodiment 1:

Embodiment 1 of the present invention will now be described with reference to FIGS. 1 to 3.

Figure 1:
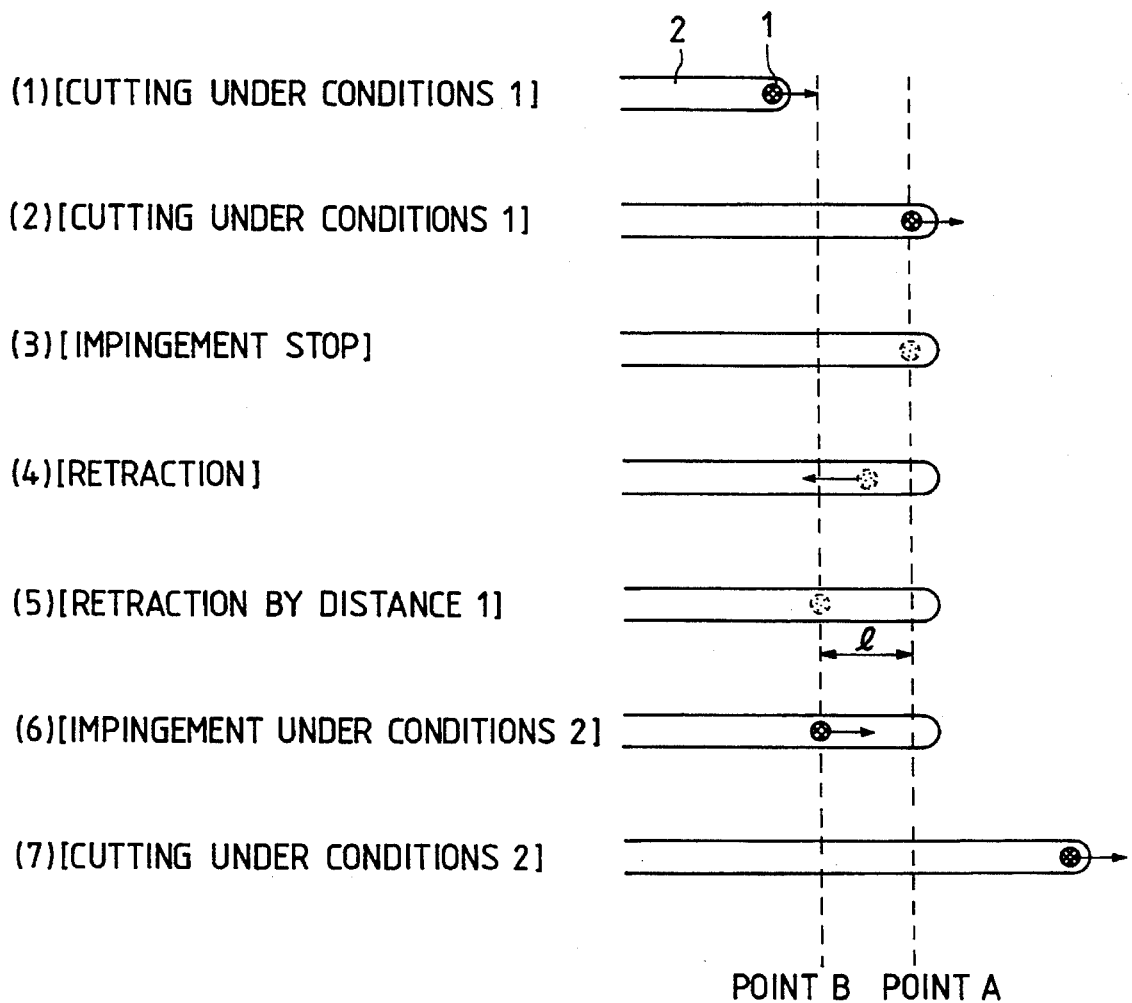
FIG. 1 is a drawing illustrating a laser cutting method of an Embodiment 1 of the present invention.

FIG. 1 mainly shows an example of changing cutting conditions of high speed and high output for ordinary straight cutting (hereinafter referred to as "first cutting conditions") to cutting conditions of low speed and low output for good corner cutting (hereinafter referred to as "second cutting conditions"), wherein cutting progresses in order of (1) to (9). In this drawing, reference numeral 1 indicates a laser beam and reference numeral 2 represents a cut groove formed by the laser beam 1. (1) denotes the state of cutting under the first cutting conditions. (2) designates the state where the laser beam has reached point A or a cutting condition changing position. (3) indicates the state where the impingement of the laser beam has stopped at point A. At (4), a laser beam impinging zone (position) is retracted along an already-cut path. In this state, the impingement of the laser beam remains stopped. (5) denotes the state where the laser beam impinging zone has been retracted to position B determined by a distance specified for condition changing. This retraction from A to B may either be performed at normal cutting speed or at a non-cutting (rapid traverse) speed. At (6), the second cutting conditions are selected at position B, and cutting is started in the original advancing direction. (7) represents the state where the laser beam impinging zone has moved past point A and cutting is in progress.

It is to be understood that the laser beam impinging zone may be retracted by moving a cutting head, by moving the workpiece, or by moving both the cutting head and the workpiece relative to each other.

Figure 22:
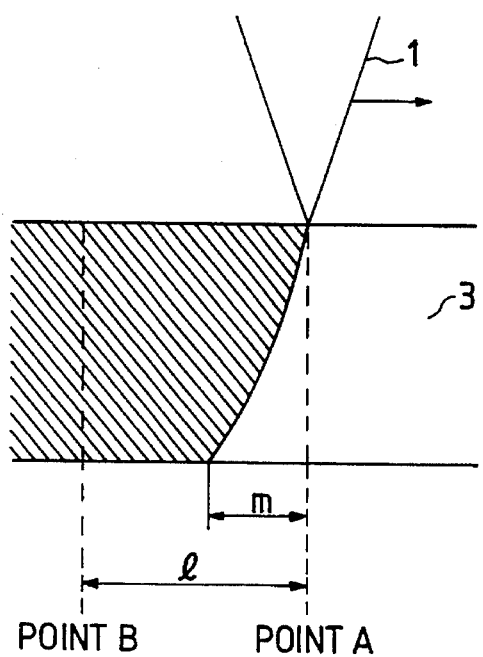
FIG. 22 is a drawing illustrating defects produced by the conventional laser cutting method and the laser cutting methods according to Embodiments 1 to 4 of the present invention.
Figure 23:
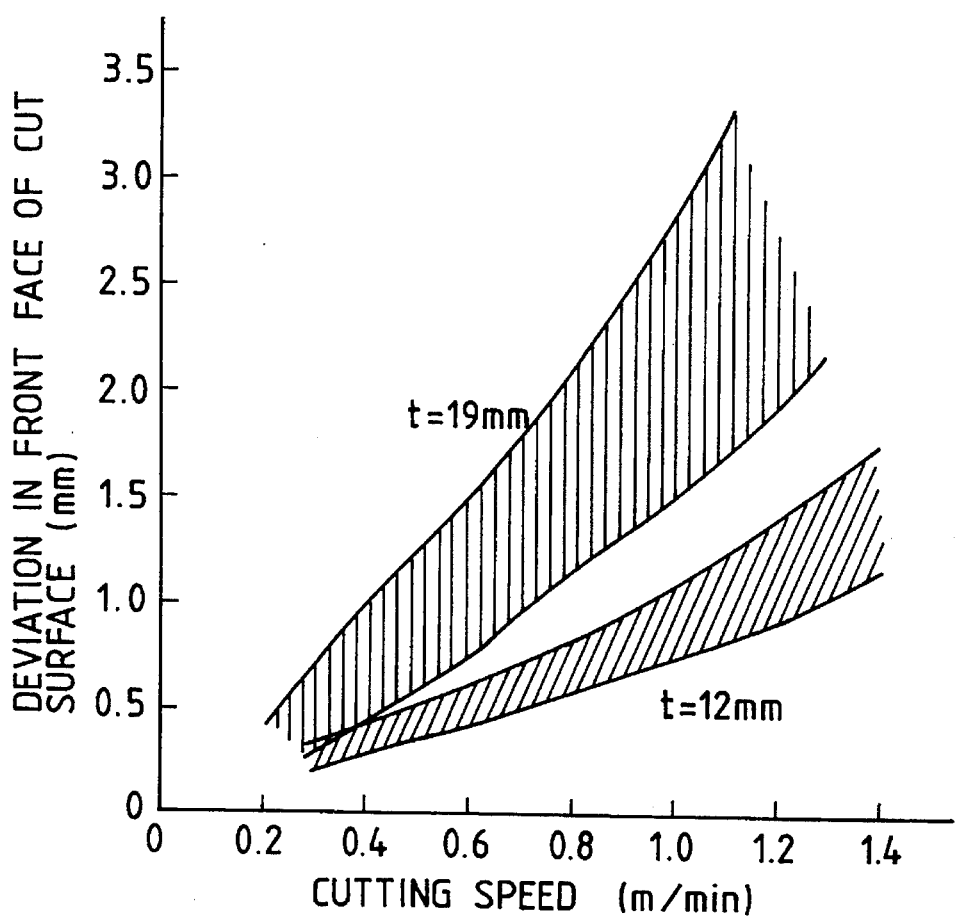
FIG. 23 is a drawing showing relationships between cutting speed and deviation in a front cut face according to workpiece thickness.

The reason why such a cutting method reduces melting faults at the condition changing portion is that the melting fault, which takes place due to assist gas disturbance and abnormal combustion in response to a deviation when the conditions are changed at position A where there is a cutting deviation ("m" in FIG. 22) produced at high temperature in a thickness direction in a front cut face as shown in FIG. 22 showing the conventional art, does not occur when the condition changing position B is outside the range of deviation "m".

Figure 2:
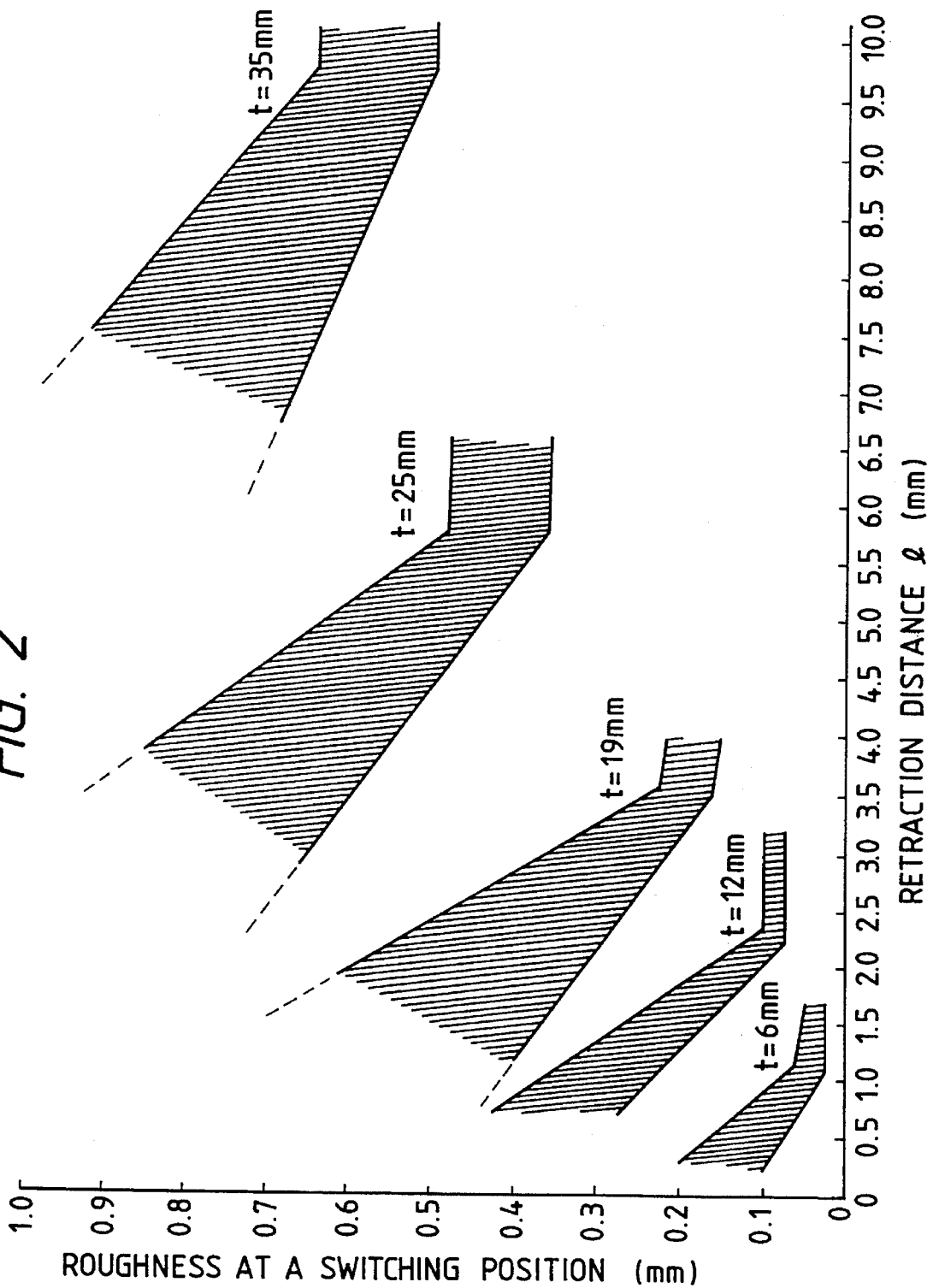
FIG. 2 is a drawing showing relationships between a retraction distance and the roughness of a switching position (cutting condition changing position) in Embodiment 1 of the present invention.
Figure 21:
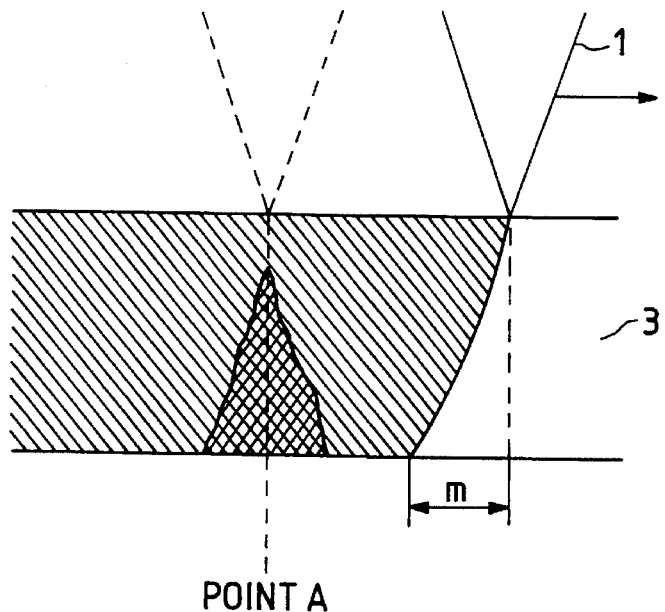
FIG. 21 is a drawing showing how a cut section is laser-cut in a conventional laser cutting method.

FIG. 2 shows relationships between the condition changing portion retraction distance l (mm) and the cut surface roughness of the condition changing position A for soft steel materials of thicknesses of 6, 12, 19, 25 and 35 mm. The roughness of the cut surface where a melting fault occurs is greater than that of an ordinary cut surface. As the retraction distance l increases, the cut surface roughness at first improves, but no further improvement occurs after a given value of l for each respective thickness, i.e., l=approximately 1.2 mm for a thickness of 6 mm, l=approximately 2.2 mm for 12 mm, and l=approximately 3.5 mm for 19 mm. As described above, the retraction distance l depends on not only the thickness, but also the deviation "m", which differs according to the cutting speed, as shown in FIG. 21. The cutting results for workpieces 6.0 mm to 35 mm thick indicate that good cuts are achieved if the retraction distance l is in the range 1 mm to 10 mm.

Needless to say, a retraction distance of 10 mm or more provides high cutting quality. However, as the retraction distance increases, more cutting time is required. As shown in FIG. 2, the retraction distance ensuring high efficiency for thicknesses of 6 mm or more is between 1 mm and 10 mm. The variations of cutting data in the figure are produced because of a difference in the retraction distance l according to the cutting conditions of speed and output, and it is difficult to specify the data strictly.

Since it is natural that a thinner workpiece results in a smaller deviation, the retraction distance l may be smaller in such cases.

Figure 3:
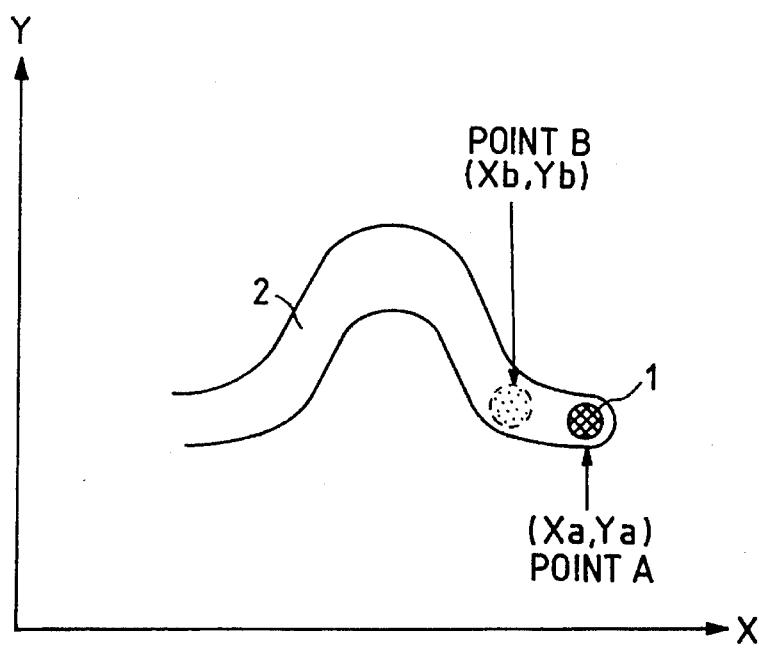
FIG. 3 is a drawing illustrating a laser cutting method for circular cutting in Embodiment 1 of the present invention.

It is to be noted that when the cutting path is straight, the retraction path can be specified by the retraction distance, but it cannot be specified by the retraction distance during the cutting of a curve as shown in FIG. 3. In such a case, the coordinate point of a retraction position B (Xb, Yb) may be specified relative to a cutting stop point (Xa, Ya). This way of specifying the coordinate point allows the retraction position to be determined easily if the shape to be cut is extremely complicated or the retraction position is in three dimensions. Point B may be determined relative to point A by defining the coordinates of B from the intersecting point of a cutting path and the path of a circle having the radius of the specified retraction l around point A, for example, or by defining a retraction path during curve cutting using a known technique.

Embodiment 2:

Embodiment 2 of the present invention will now be described with reference to FIGS. 4 to 9.

Figure 24:
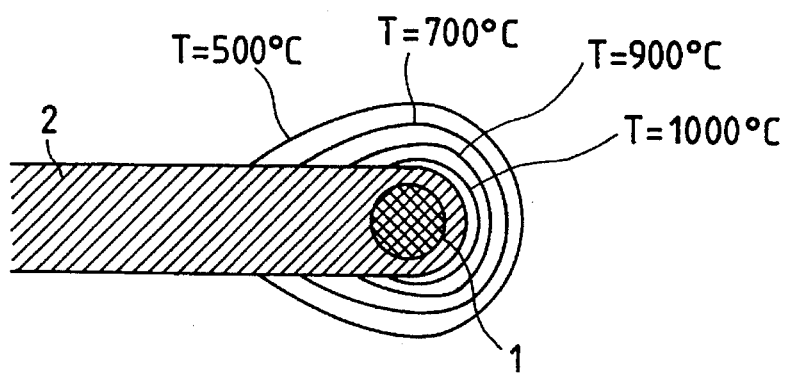
FIG. 24 is a drawing showing the temperature distribution of a front cut face viewed from top.

One of the causes of melting faults occurring at the condition changing position is a cutting failure occurring at a front cut face where the temperature is high, as shown in FIG. 24. However, merely stopping the impingement of the laser beam cools the material, improving cutting quality.

Figure 4:
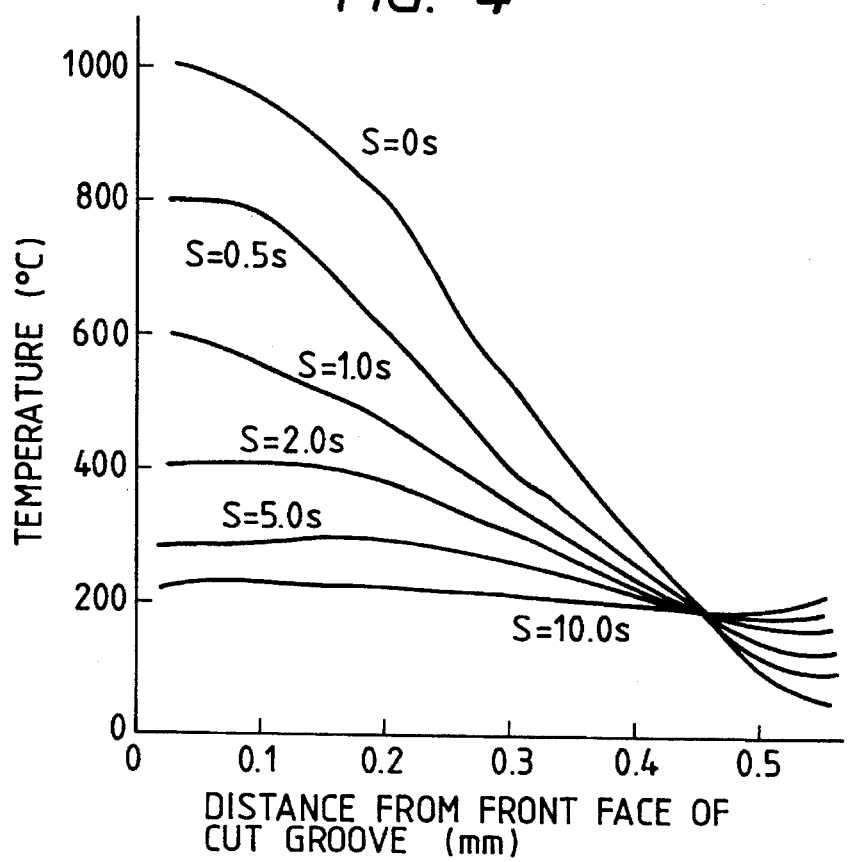
FIG. 4 is a drawing showing relationships between a distance from the front face of a cut groove and the temperature at that position in an Embodiment 2 of the present invention.
Figure 5:
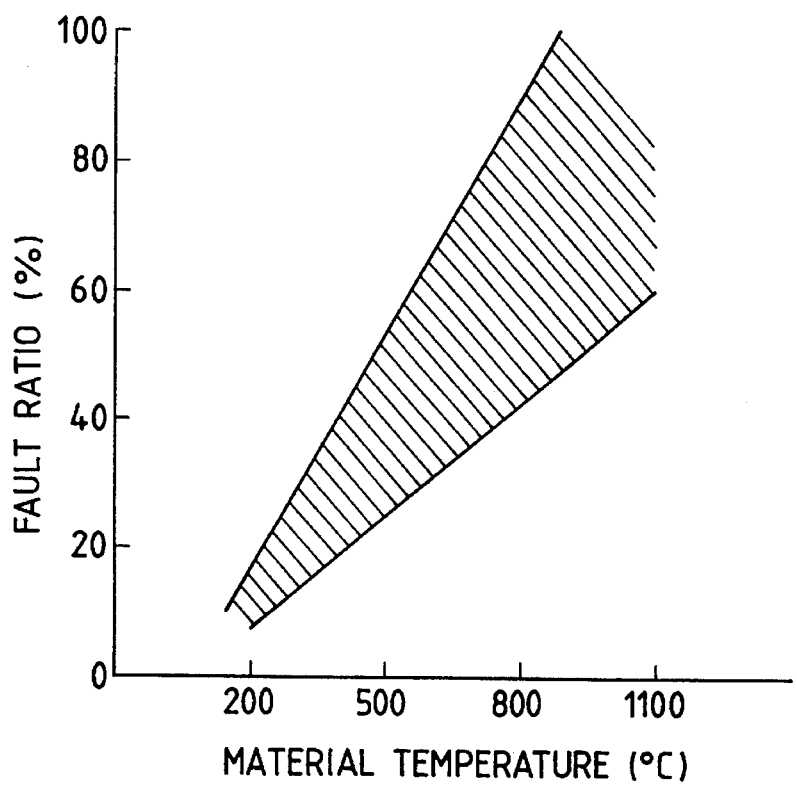
FIG. 5 is a drawing showing relationships between the temperature of a workpiece and a fault ratio at the cutting condition changing position in Embodiment 2 of the present invention.

FIG. 4 shows relationships between a distance from the front cut face and temperature at that position measured as soon as the impingement of the laser beam is stopped. S in the drawing indicates a length of time (seconds) beginning with the stopping of the laser beam impingement. In the vicinity of the front cut face, the temperature falls to 220° C. about 10 seconds (S=10 sec) after laser beam impingement has stopped, i.e., at S=0 sec. At 220° C., no cutting faults occur. FIG. 5 shows relationships between material temperature at the cutting condition changing position and a fault ratio resulting from 200 times of condition changes for a soft steel material 16 mm thick. The fault ratio decreases in proportion to the material temperature, and hardly any faults occur at a material temperature of approximately 200° C. or less, posing no cutting problems. As described above, the provision of a cutting stopping time is effective for the reduction of cutting faults.

Figure 6:
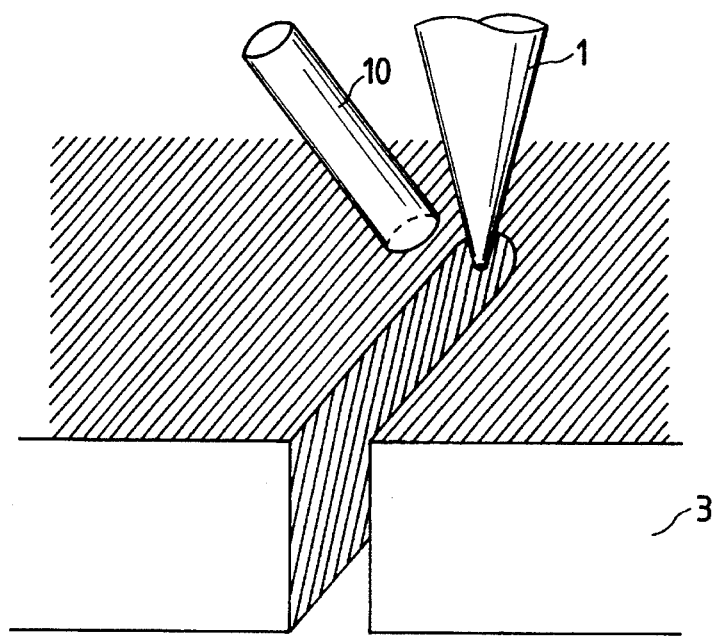
FIG. 6 is a drawing roughly illustrating how a liquid or a gas is injected to a cut portion to cool the cut portion in Embodiment 2 of the present invention.
Figure 7:
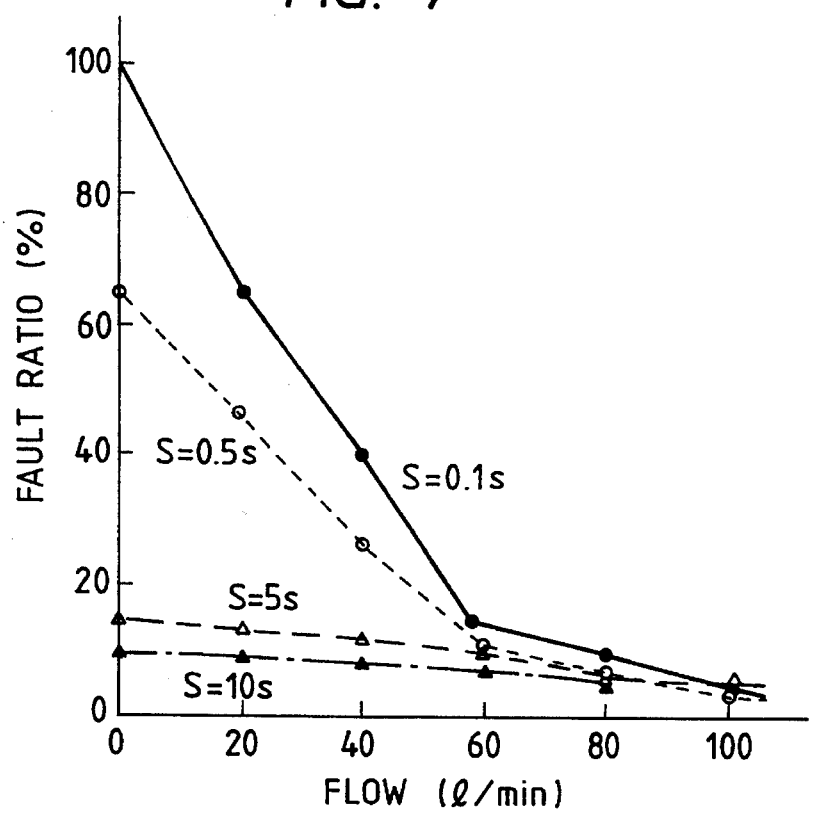
FIG. 7 is a drawing showing relationships between the flow of water injected and a fault ratio in Embodiment 2 of the present invention.

FIG. 6 generally illustrates how oxygen gas is injected to a cut portion for cooling. Reference numeral 1 indicates a laser beam, reference numeral 3 represents a workpiece, and reference numeral 10 designates a 6 mm diameter nozzle from which a gas or a liquid is injected. The liquid or gas is injected from the nozzle 10 at the cutting stop position to cool the cut portion, and cutting is then resumed. FIG. 7 shows relationships between the flow of the gas injected from the nozzle 10 and the fault ratio in the cutting of 16 mm thick workpieces according to experimental results obtained by changing thee injection time. Cutting conditions of 600W output, 30 Hz pulse frequency, 30% duty cycle and 100 mm/min cutting speed have were changed to 2000W output, 1300 Hz pulse frequency, 60% duty cycle and 900 mm/min cutting speed to evaluate the condition changing position.

The experimental results indicate that the fault ratio decreases as the flow rate or gas injection time increases. This is attributable to the fact that the temperature of the condition changing position is reduced. The liquid used in place of the gas for cooling also produces the same effect.

The cut portion can also be cooled with the same effect by an assist gas injected by the cutting head. It is to be noted that since a relatively expensive assist gas, such as an Ar gas, leads to high operating costs, it is preferable to use a less expensive gas such as $O_2$ or $N_2$.

Figure 8:
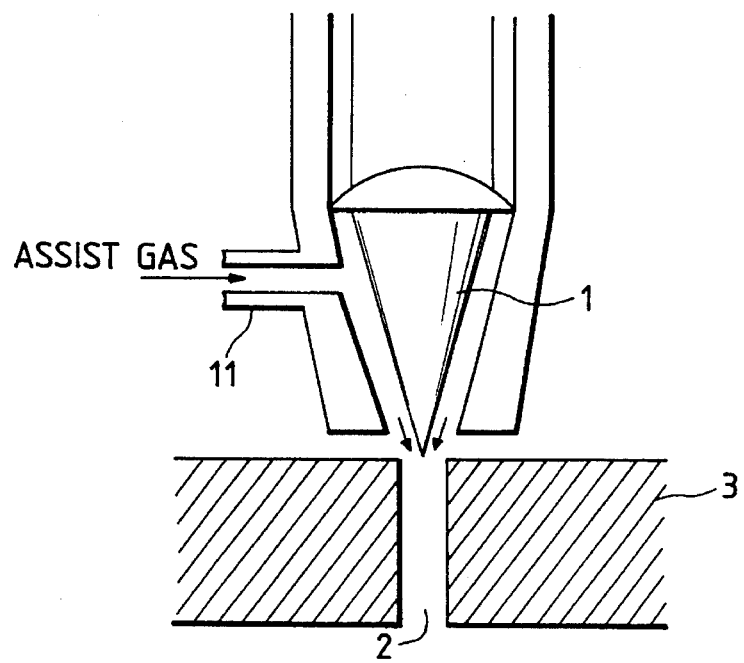
FIG. 8 is a drawing depicting how an assist gas is injected to a cut portion to cool the cut portion in Embodiment 2 of the present invention.

FIG. 8 illustrates generally how the assist gas is injected to a cut portion for cooling. Reference numeral 1 indicates a laser beam, reference numeral 2 denotes a cut groove, reference numeral 3 represents a workpiece, and reference numeral 11 designates an assist gas supply port. $O_2$ gas or the like is injected from the nozzle at a cutting stop position to cool the cut portion, and cutting is then resumed.

Figure 9:
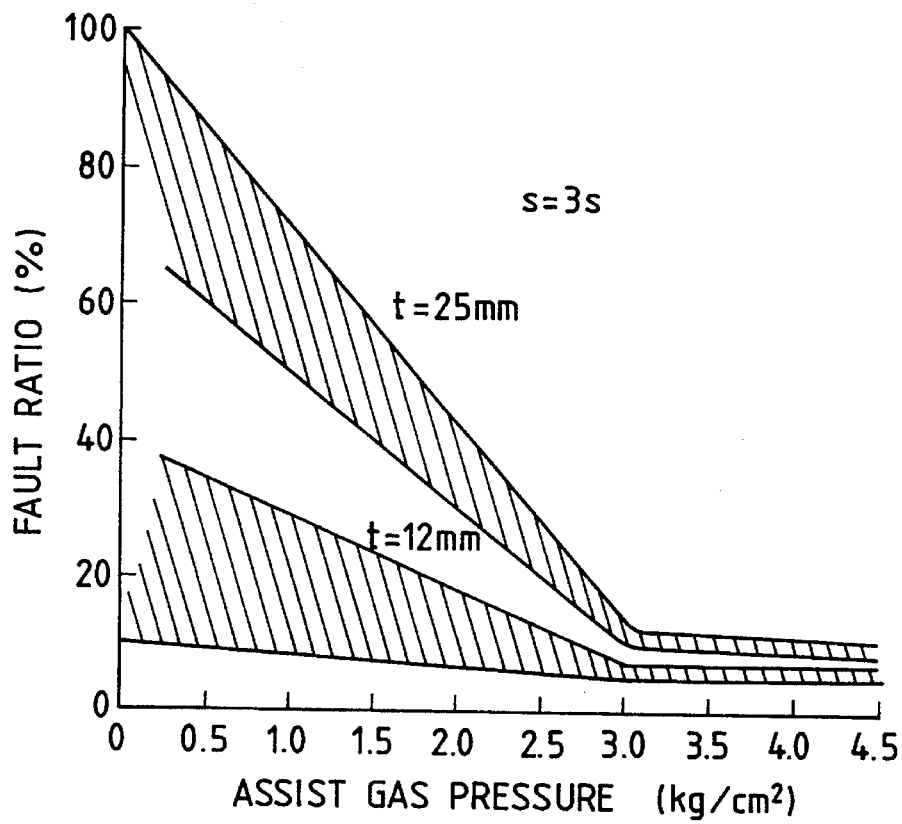
FIG. 9 is a drawing illustrating relationships between the pressure of the assist gas and a fault ratio in Embodiment 2 of the present invention.

FIG. 9 shows fault ratios where the cut portion is cooled at various assist gas pressures for 3 seconds (S=3 sec), the cutting conditions are then changed, and cutting is restarted. The workpieces cut are soft steel materials 12 mm and 25 mm thick. For each thickness, the increase in assist gas pressure raises the cooling efficiency and reduces the fault ratio. If the workpiece is thin, the fault ratio is decreased if the pressure is low, but if workpieces 25 mm and thinner are all cut under like conditions, the pressure must be set to 3 kg/cm$^2$. As a result, the higher the pressure of the assist gas, the more ineffective is the fault ratio due to the increase of the cooling efficiency at the cutting condition changing position. However, no further improvement is seen beyond 3 kg/cm$^2$. Therefore, it is preferable to set the gas pressure to be not less than 3 kg/cm$^2$. The reason why the improvement of the fault ratio is ineffective at not less than 3 kg/cm$^2$ is that the spraying pressure of the assist gas from the nozzle is defined by the shape of the nozzle and the viscosity of a liquid.

Cutting conditions for the workpiece 25 mm thick were 2800W output, 1300 Hz pulse frequency, 60% duty cycle and 650 mm/min cutting speed, and cutting conditions for the workpiece 12 mm thick were 1800W output, 1300 Hz pulse frequency, 40% duty cycle and 1000 mm/min cutting speed.

Accordingly, by spraying in Embodiment 1 a gas or a liquid at a desired pressure for a period of time according to the material and thickness of the workpiece on and in the vicinity of the cutting path along which the laser beam impinging zone moves during a series of operations between the stopping and restarting of laser beam impingement, the gas or liquid causes the amount of heat accumulated near the cutting stop position to be decreased, preventing the occurrence of melting faults much better than in Embodiment 1.

Also, by resuming movement after stopping for a desired period of time at any point during a series of operations between the stopping and restarting of laser beam impingement in Embodiment 1, natural heat dissipation causes the accumulated heat of the workpiece to decrease during the stopping time, preventing the occurrence of a melting fault much better than in Embodiment 1.

Also, by resuming movement after stopping temporarily at any point during a series of operations between the stopping and restarting of laser beam impingement and spraying an assist gas at the stopping point in the cutting path for a desired period of time at a pressure of 3 kg/cm$^2$ in Embodiment 1, natural heat dissipation and the assist gas cause the accumulated heat of the workpiece to be decrease during the stopping time, preventing the occurrence of a melting fault much better than in Embodiment 1.

Figure 10:
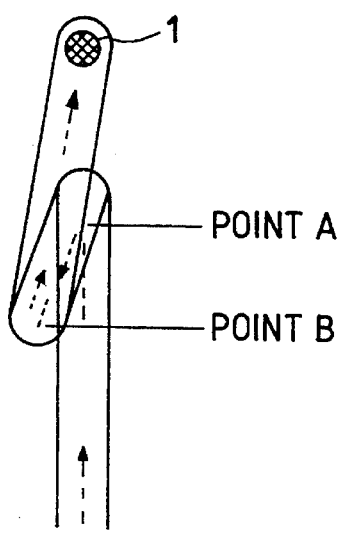
FIG. 10 is a drawing illustrating an Embodiment 3 of the present invention showing the operation of Embodiment 1 performed in a conventional offset method.

Embodiment 3:

Embodiment 3 of the present invention will now be described with reference to FIGS. 10 to 12.

Figure 11A:
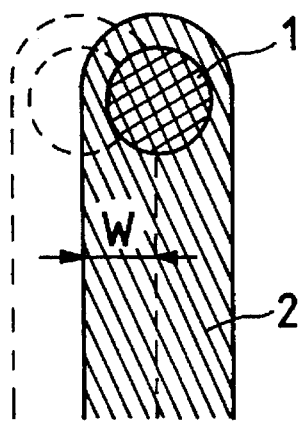
FIGS. 11(a) and 11(b) respectively illustrate for Embodiment 3 an example wherein an offset is made to the right and left relative to the beam direction.
Figure 11B:
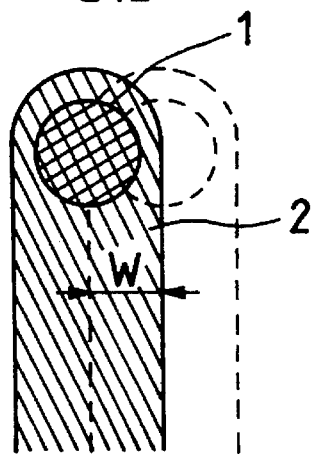

FIGS. 11(a) and 11(b) illustrate how the cutting path is offset by a cut groove width. Of these drawings, FIG. 11(a) shows an example wherein an offset of W is made to the right relative to the advance direction of the laser beam and FIG. 11(b) shows an example wherein an offset of W is made to the left. The offset directions are assigned with G codes, such as G41 and G42, in a program and are entered together with offset amounts.

The direction of offsetting the cutting path by the cut groove width is only to the right or left relative to the advancing direction, as described above. Since the cutting path was always in the same direction in the conventional methods, there is no problem posed in offsetting only to the right or left.

In Embodiment 1 of the present invention, however, the advancing direction is reversed at the cutting condition changing position. Hence, the offset direction must be taken into account to prevent faults such as indicated in FIG. 10. Namely, in FIG. 10, the workpiece is cut up to point A under the first cutting conditions, whereupon the laser beam impinging zone is retracted to point B. However, since the offsets are made in the same direction and the offset direction is not changed, the offset deviates from the cutting path, as indicated at point B in FIG. 10. This is due to the current function by which the cutting path is offset by a specified amount when a regular offset is completed at the end of a straight path after the designation of the offset.

Figure 12A:
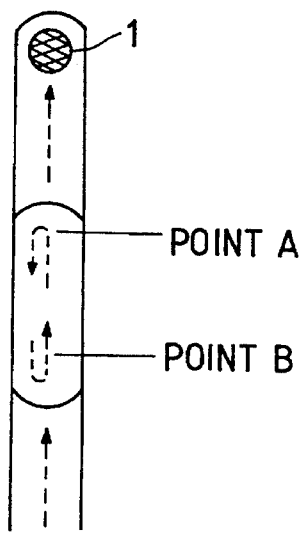
FIGS. 12(a) and 12(b) show the operation of retraction control and a program therefor performed in an offset method in Embodiment 3 of the present invention.
Figure 12B:
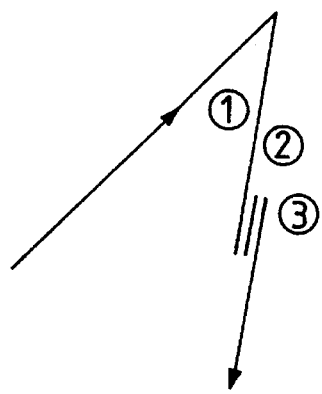

FIGS. 12(a) and 12(b) respectively depict a cutting procedure and a program therefor where the offset direction is reversed at position A where the advance direction is reversed, the laser beam impinging zone is retracted to point B, and the offset direction is further reversed at the restart of cutting. To achieve this, code G42 is specified to cancel the offset in code G41 and reverse the offset direction when the laser beam impinging zone returns from point A to point B, and code G41 is specified for point B to cancel the offset in code G42 and cut the workpiece in the original offset amount and direction.

Embodiment 4:

Embodiment 4 of the present invention will now be described with reference to FIGS. 13 to 17.

Figure 13:
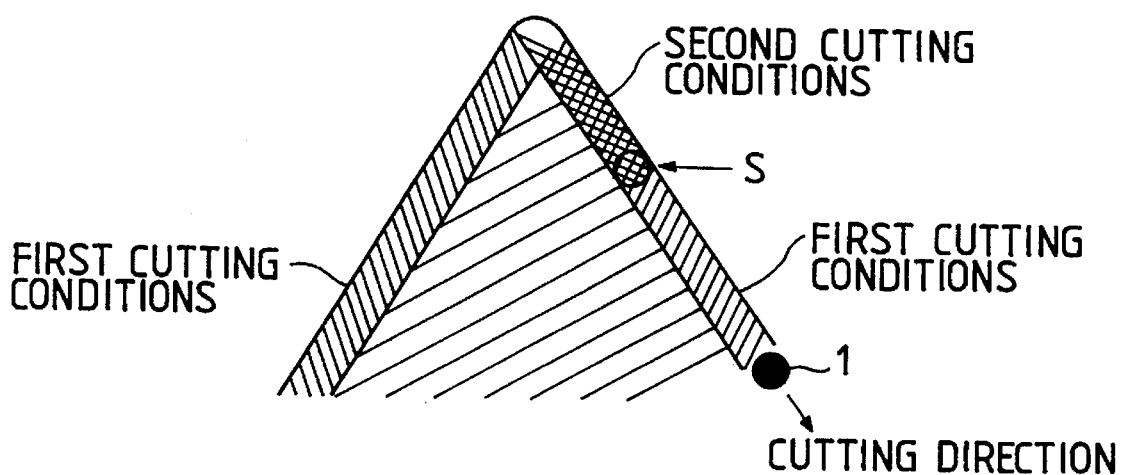
FIG. 13 is a drawing illustrating a laser cutting method in an Embodiment 4 of the present invention.
Figure 27:
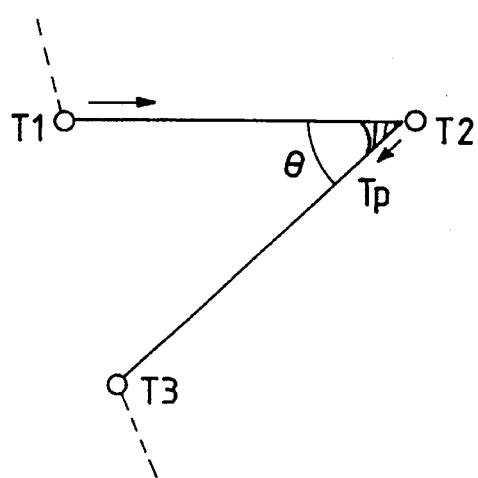
FIG. 27 is a drawing illustrating a further alternative conventional laser cutting method.

FIG. 13 shows a laser cutting method according to Embodiment 4 of the present invention, wherein reference numeral 1 indicates a laser beam and S represents a portion to which the laser beam impingement returns and at which the workpiece is re-cut when the second cutting conditions are changed to the first. Namely, Embodiment 4 provides an example wherein Embodiments 1 to 3 are applied to the cutting method shown in FIG. 27 (method wherein the first cutting conditions are used for cutting up to the point of the corner, the second cutting conditions are used for cutting between said point and S, and the first cutting conditions are used for cutting from S in order to increase cutting efficiency), i.e., the retraction operation of the laser beam impinging zone described in Embodiment 1 is performed at the cutting condition changing position S, an active cooling operation of the workpiece as described in regard to Embodiment 2 is performed during the retraction, and further the offset operation described in Embodiment 3 is performed during the retraction.

Figure 14:
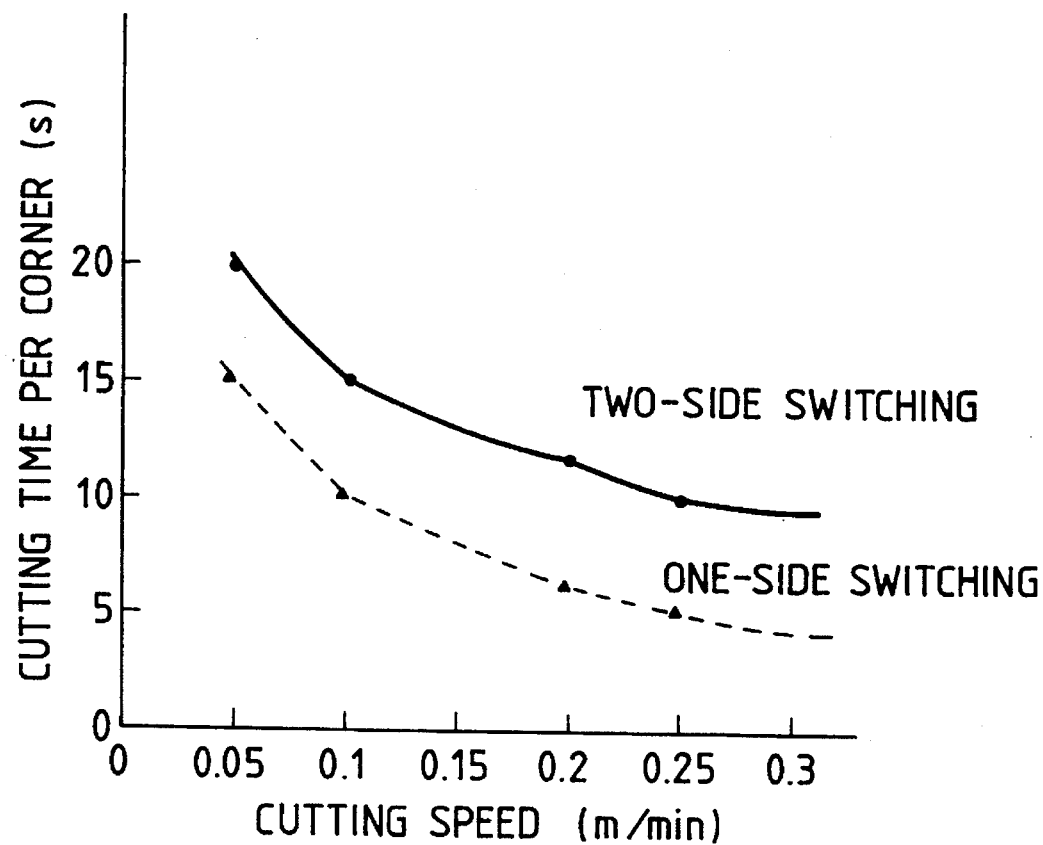
FIG. 14 is a drawing showing relationships between the cutting time and cutting speed of a corner in the method of Embodiment 4 of the present invention and in a conventional method.
Figure 25:
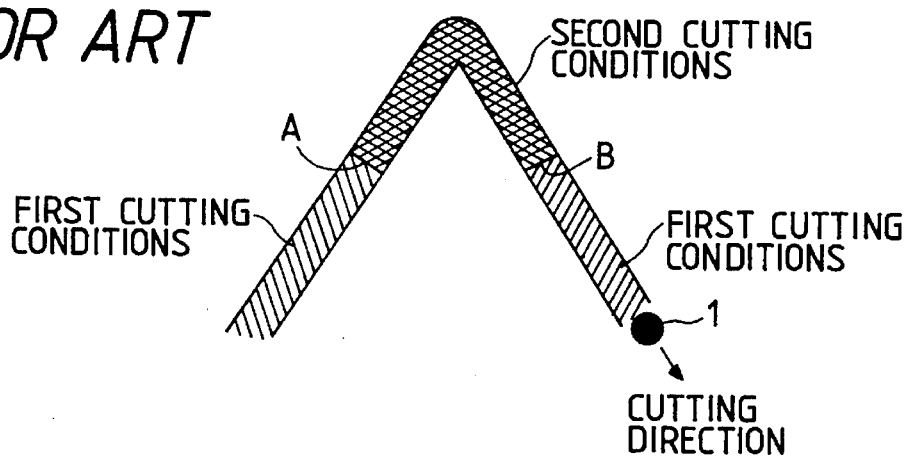
FIG. 25 is a drawing showing how a corner is cut in an alternative conventional laser cutting method.
Figure 26:
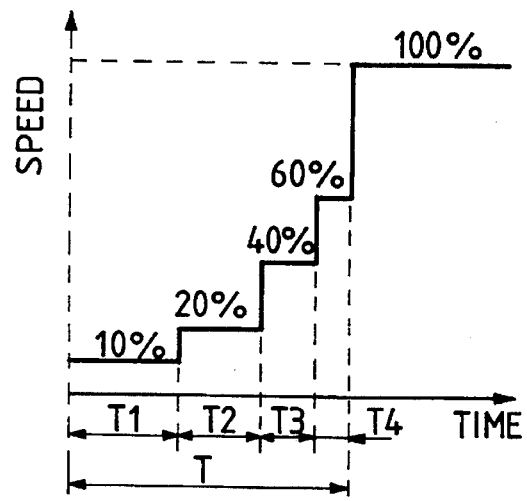
FIG. 26 is a drawing illustrating an alternative conventional laser cutting method.

In the present embodiment, as shown in FIG. 14, condition changing is effected once per corner, and the distance of cutting under the second cutting conditions is halved to reduce the cutting time. The quality of the cut surface is greatly improved by the operations performed at point S as compared to the conventional method illustrated in FIG. 25 (the method wherein the first cutting conditions are changed to the second cutting conditions just before the corner and the second cutting conditions are changed back to the first cutting conditions again after the point of laser beam impingement has moved past the corner).

FIG. 14 shows the cutting speed and cutting time per corner on the assumption that the distance between the vertex of the corner and the condition changing position is 10 mm and the cooling time at the condition changing position is 5 sec. In this drawing, one-side switching indicates the conventional method shown in FIG. 25 and two-side switching indicates the method according to the present embodiment.

Figure 15:
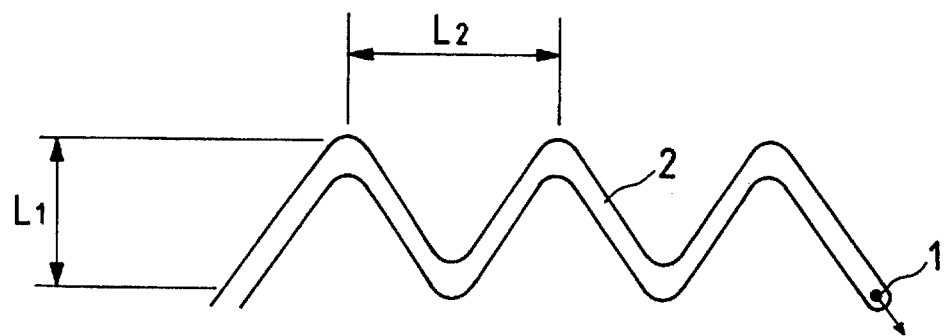
FIG. 15 is a drawing illustrating a cutting shape in Embodiment 4 of the present invention.

The output condition in the first cutting conditions under which the workpiece is cut up to the corner is important for zigzag cutting where corners are close to each other as shown in FIG. 15.

Figure 16:
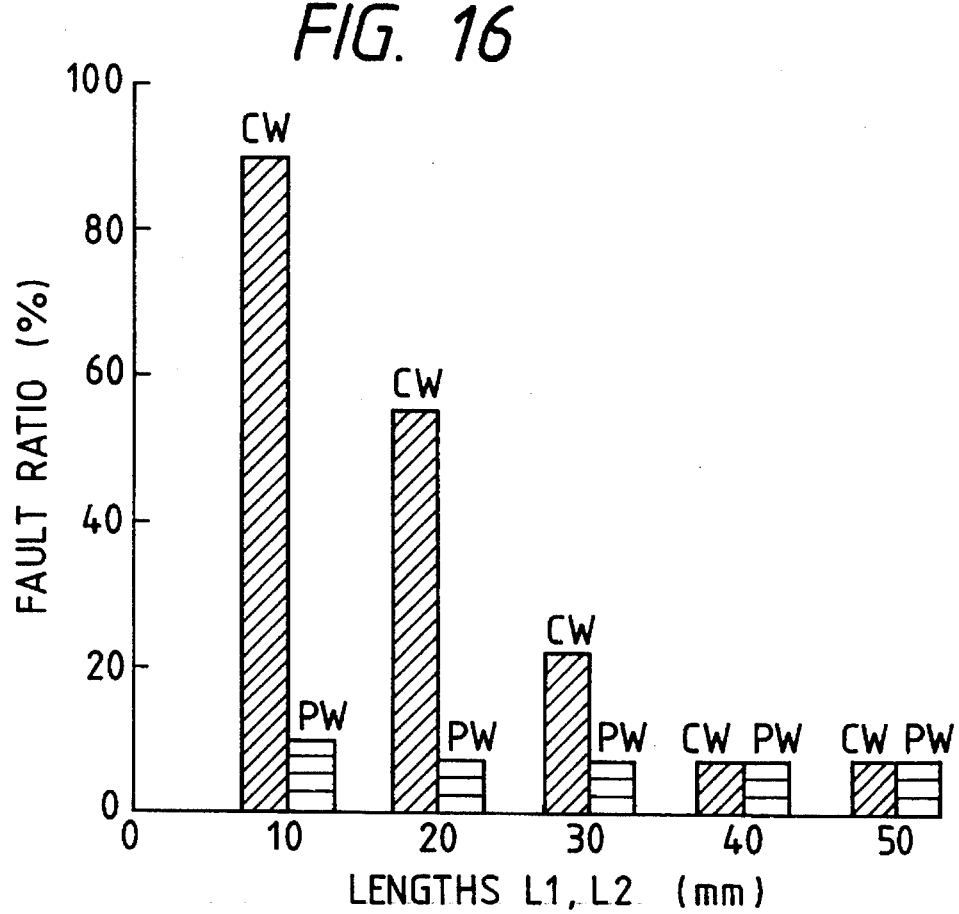
FIG. 16 is a drawing relating to Embodiment 4 of the present invention showing relationships between lengths L1, L2 and a fault ratio, where CW and PW are used as the first cutting conditions of the cutting shape in FIG. 15.

FIG. 16 shows fault ratios on the assumption that lengths L1 (distance between the vertices of corners in a direction perpendicular to the longitudinal direction of the zigzag) and L2 (distance between the vertices of corners in the longitudinal direction of the zigzag) in FIG. 15 are 10, 20, 30, 40 and 50 mm and continuous-wave output (CW) and pulse output (PW) are used as the first cutting condition under which the workpiece is cut up to the corner. As is apparent from this drawing, the fault ratios of CW are high when the lengths L1 and L2 are between 10 and 30 mm, but there are no differences between the fault ratios of CW and PW at lengths of 40 mm and more, and the workpiece can be cut well with CW and PW.

Hence, it has been found that when a fault is likely to occur with small dimensions L1 and L2 (when lengths L1 and L2 are approximately between 10 and 30 mm), it is preferable to use pulse output (PW) as both the first and second cutting conditions because of its ease of heat input control for the workpiece, and when there is substantially no danger that a fault will occur with large dimensions L1 and L2 (when lengths L1 and L2 are approximately 40 mm or more), it is preferable to use continuous-wave output (CW) as the first cutting condition because of its capability to achieve high cutting speed and high cut surface quality, and to use pulse output (PW) as the second cutting condition.

Figure 17:
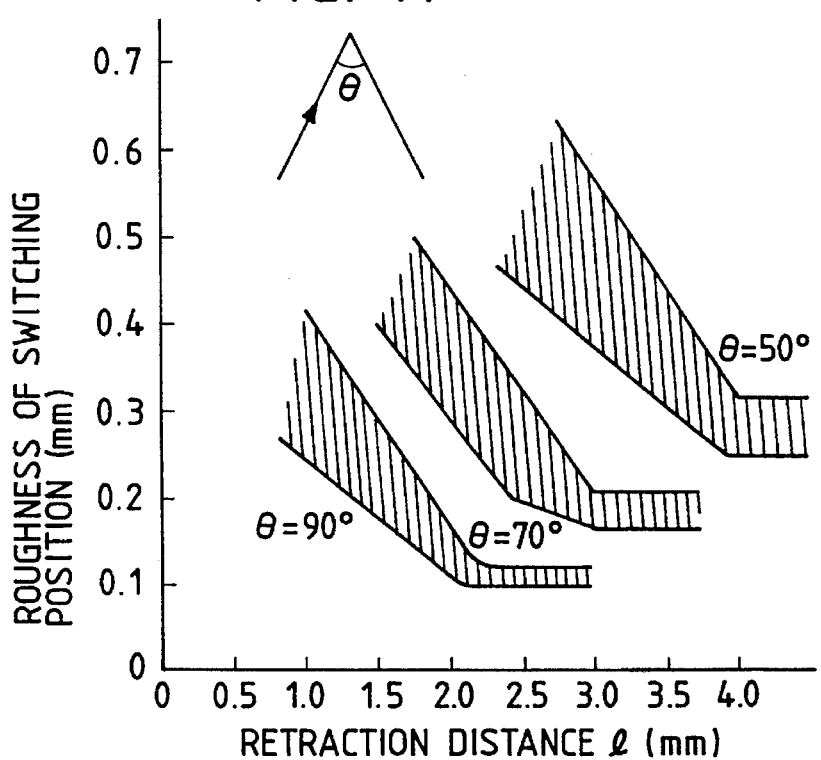
FIG. 17 is a drawing concerning Embodiment 4 of the present invention showing relationships between a retraction distance at the time of condition changing and cut surface roughness of a condition changing position.

FIG. 17 shows that at the cutting condition changing position, there are optimum values of the retraction distance l according to a cutting angle Θ. FIG. 17 shows the results of cutting soft steel material of a thickness of 16 mm at three different angles of 90°, 70° and 50°. The amount of improvement of cut surface roughness tends to level out when l=approximately 2.2 mm at an angle Θ of 90°, when l=approximately 3 mm at an angle Θ of 70°, and when l=approximately 3.7 mm at an angle Θ of 50°. As described above, it has been found that the retraction distance l must be changed according to the cutting angle.

Embodiment 5:

Embodiment 5 of the present invention will now be described with reference to FIG. 18.

Figure 18:
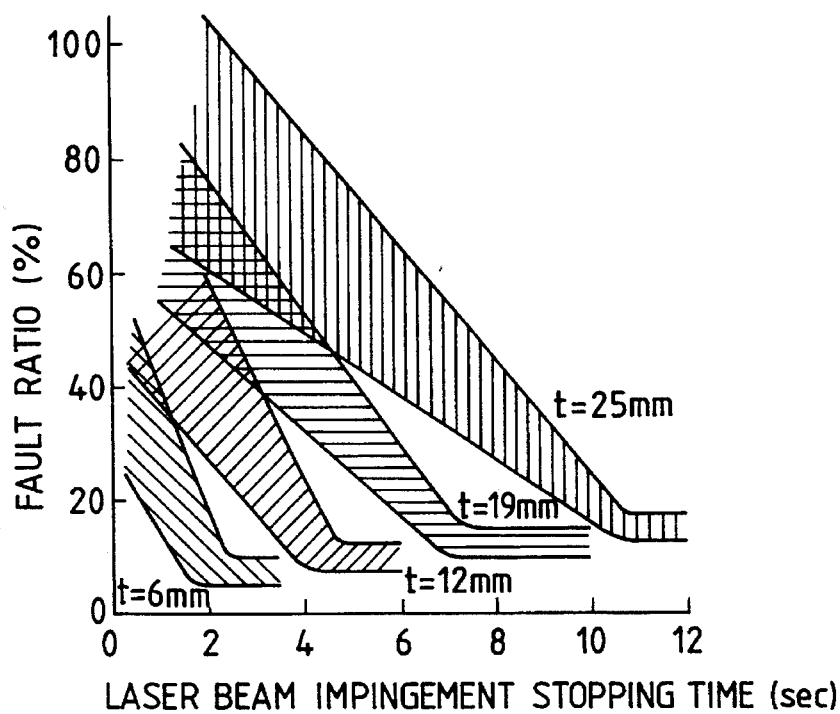
FIG. 18 is a drawing showing relationships between laser beam impingement stopping time and a fault ratio in Embodiment 5 of the present invention.

FIG. 18 shows relationships between beam stopping time and fault ratio where the start of cutting after the end of piercing is made after the impingement of the laser beam has been stopped and the workpiece has cooled. The data shown is the result of cutting soft steel materials 6, 12, 19 and 25 mm thick. The cutting conditions are as indicated in Table 2.

TABLE 2

| Thickness | Piercing Conditions | Cutting Conditions after Piercing |
|---|---|---|
| 6 mm | 440 W, 200 Hz, 20% | 1200 W, 1200 mm/min. |
| 12 mm | 550 W, 200 Hz, 30% | 1800 W, 1000 mm/min. |
| 19 mm | 700 W, 200 Hz, 40% | 2200 W, 700 mm/min. |
| 25 mm | 850 W, 200 Hz, 45% | 3000 W, 600 mm/min. |

Although a longer laser beam impingement stopping time results in a lower fault ratio for each thickness, no further improvements in that effect occur for a stopping time of longer than a given value dependent upon thickness, i.e., 2.5 sec when t=6 mm, 4.5 sec when t=12 mm, 6.5 sec when t=19 mm, and 10 sec when t=25 mm. As described above, when cutting is started with the material temperature high immediately after piercing, a cutting fault is likely to occur due to a mis-combustion phenomenon. However, the probability of this fault occurring is greatly reduced if the material temperature is lowered only slightly. It has been found that a long cooling time must be employed because the rate of material temperature reduction depends on the thickness of the material and larger thicknesses require a longer time for the material temperature to drop sufficiently.

When cutting is started following piercing, it is preferable to resume movement after spraying the assist gas at a stop point along the path at a pressure of 3 kgf/cm$^2$ or more for a given period of time in order to improve the cooling effect on the workpiece, as described in Embodiment 2, in a series of operations in which the impingement of the laser beam is stopped after piercing and the laser beam is caused to impinge again to start cutting.

Embodiment 6:

Embodiment 6 of the present invention will now be described with reference to FIGS. 19 and 20.

Figure 19:
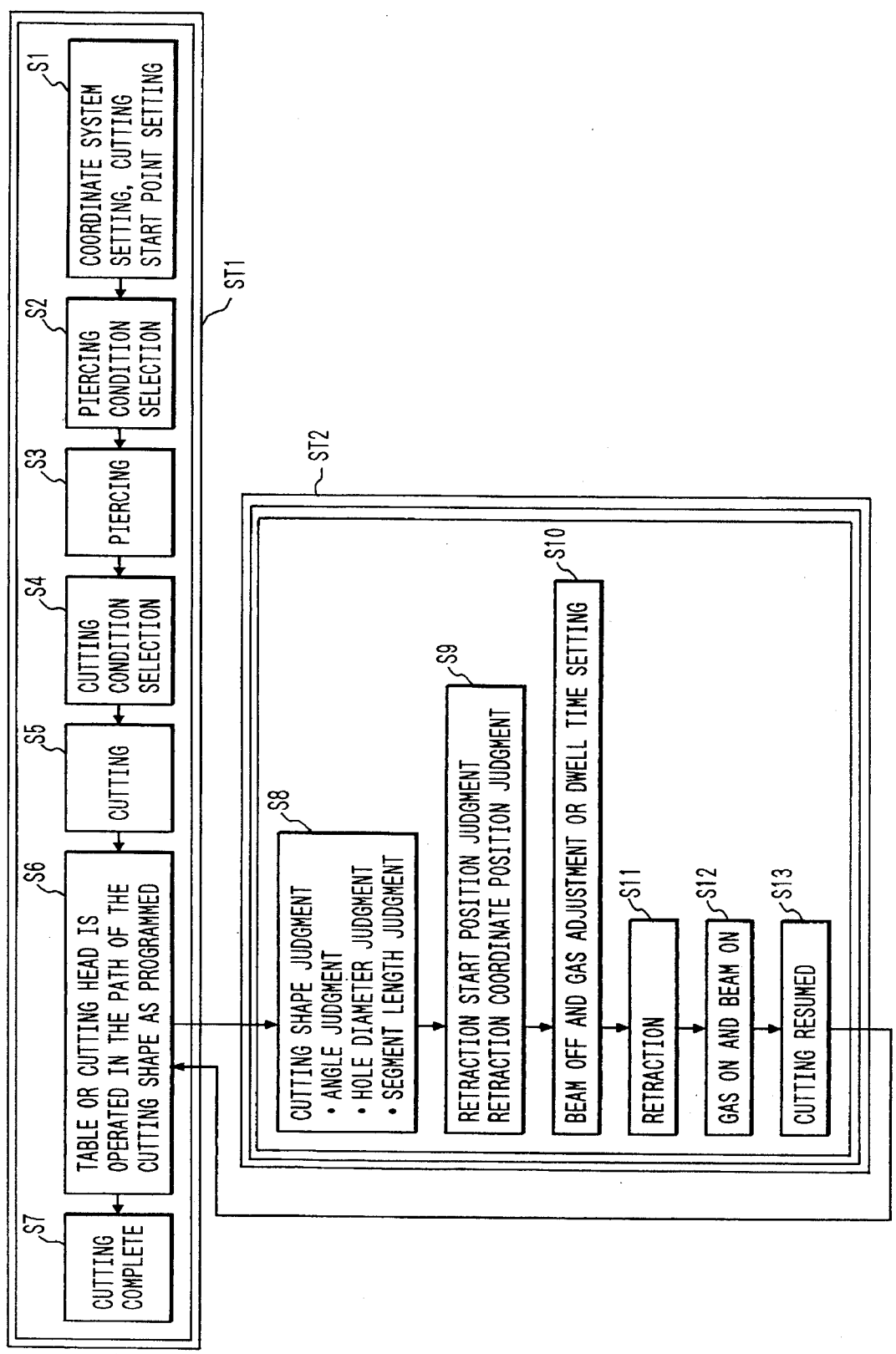
FIG. 19 is a block diagram relating to Embodiment 6 of the present invention showing an apparatus for executing the laser cutting methods of Embodiments 1 to 4.

FIG. 19 is a block diagram showing the functions of a control unit or an automatic programming unit which automatically determines the retraction distance to prevent a cutting fault from occurring at the cutting condition changing position described in Embodiments 1 to 4. In this drawing, ST1 indicates the functions of the conventional apparatus and ST2 represents additional functions provided by the present embodiment. At S1 inside ST1, an increment or absolute value coordinate system and a cutting start point are set. At S2, the conditions of piercing performed at the cutting start point are set through selection from memory or input from external means. At S3, piercing is performed to cut a hole. At S4, cutting conditions are set through selection from memory or input from external means. At S5, cutting is started. At S6, the path of laser beam movement is controlled in accordance with cutting shape information supplied from a cutting program, and the cutting ends at S7.

In the present embodiment, S8, where information on the angle, hole diameter and segment length of the shape to be cut is read in advance, is executed during the execution of S6. Then, at S9, the starting position of retraction and a coordinate position after the retraction are determined. At S10, beam OFF/gas pressure adjustment or OFF/dwell time setting is executed after the retraction starting position has been reached. At S11, the cutting position is moved to the specified retraction coordinates. At S12, gas ON or cutting gas pressure adjustment and beam ON are executed. At S13, the cutting is resumed and the operation returns to S6.

Figure 20:
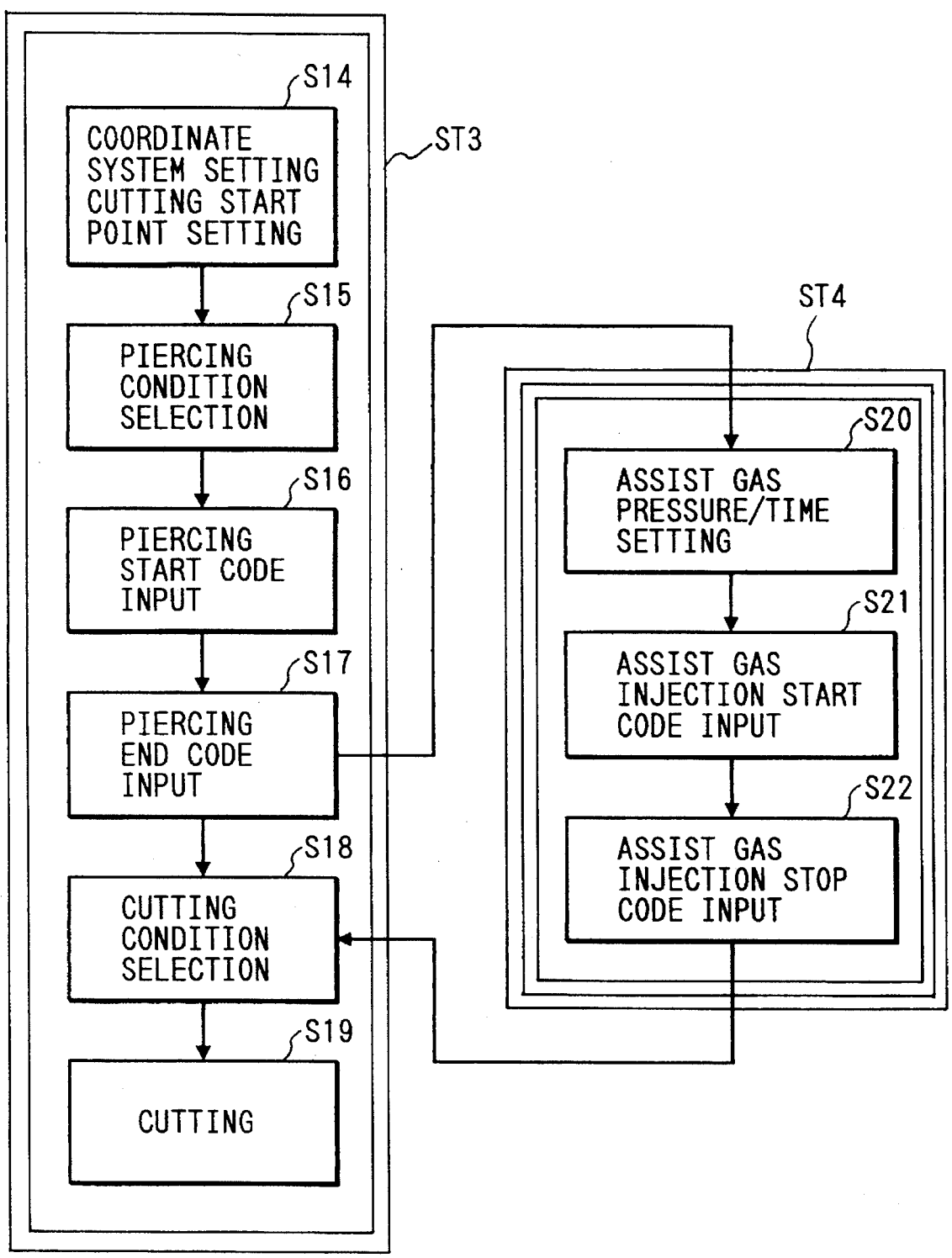
FIG. 20 is a block diagram relating to an Embodiment 6 of the present invention an apparatus for executing a laser cutting method of Embodiment 5.

FIG. 20 is a block diagram showing the functions of a control unit or an automatic programming unit which automatically determines the retraction distance to prevent a cutting fault from occurring when cutting is started after the end of piercing as described in Embodiment 5. ST3 indicates conventional arithmetic control and ST4 represents additional control provided by the present embodiment.

At S14 inside ST3, an increment or absolute value coordinate system and a cutting start point are set. At S15, the conditions of piercing performed at the cutting start point are set through selection from memory or input from external means. At S16, piercing is performed to cut a hole. At S17, the piercing is terminated after a preset length of time or using a sensor or the like which detects its termination. At S18, cutting conditions are set through selection from memory or input from external means. At S19, the cutting is started.

In the present embodiment, control at ST4 is exercised on termination of piercing at S17. At S20, the pressure and injection time of the assist gas for cooling are set. At S21, the injection of the assist gas is started in accordance with the information set at S20. At S22, the injection of the assist gas is stopped and the operation advances to S18.

It will be apparent that the first embodiment, as described above, achieves laser cutting wherein, when the cutting conditions are to be changed during cutting, the impingement of the laser beam is stopped in a linear or a circular position where the cutting conditions are to be changed, the laser beam impinging zone is retracted a predetermined distance along the cutting path to the aforementioned position, the impingement of the laser beam is restarted, and the laser beam impinging zone is moved along the same path as for retraction with the laser beam impinging to resume cutting. In this process, the retraction of the front cut end at the time of condition changing eliminates the influence of sudden changes in cutting speed, cutting output, etc., during the cutting which would otherwise result in deterioration of the cut surface. Further, the flow of the assist gas is not disturbed, no melting fault occurs in the cut surface at the condition changing position, and high cutting quality is obtained.

It will also be apparent that the second embodiment achieves a laser cutting method wherein when retracted, the position of the laser beam impinging zone is offset a beam diameter size in the opposite direction to the offset in the cutting direction, and when advanced in the cutting direction again, the laser beam impinging zone is offset by the beam diameter size in the same direction as the offset in the cutting direction, whereby, when returned to the laser beam impingement stopping position again, the laser beam impinging zone returns to the laser beam impingement stopping position reliably, and further the workpiece can be cut with higher accuracy than in the laser cutting method of the first embodiment.

It will also be apparent that the third embodiment achieves a laser cutting method wherein the laser beam impinging zone is retracted by an amount corresponding to the size of a defect in the workpiece which would otherwise be produced when the cutting conditions are changed, whereby, because the laser beam impinging zone is not retracted by more than the minimum amount necessary, generally a shorter cutting time is required than in the laser cutting methods of the first and second embodiments, while still retaining the advantageous effects of the first and second embodiments.

It will also be apparent that the fourth embodiment provides a laser cutting method wherein any of an operation in which a gas or a liquid (fluid) is sprayed at a desired pressure for a given period of time according to the material and thickness of the workpiece on and around the cutting path in which the laser beam impingement moves during a series of operations between the stopping and restarting of laser beam impingement, an operation in which movement is resumed after it has been stopped for a desired period of time at any point during a series of operations between the stopping and restarting of laser beam impingement, and an operation in which movement is resumed after it has been stopped temporarily at any point during a series of operations between the stopping and restarting of laser beam impingement and an assist gas has been sprayed at a desired pressure on a stop point in the path for a desired period of time, whereby in addition to the effects of any of the first to the fourth inventions, the amount of heat accumulated near the cutting stop position can be reduced and the occurrence of melting faults prevented much more effectively than in the first to the fourth embodiments.

When a gas or a liquid is sprayed at a desired pressure for a given period of time according to the material and thickness of the workpiece on and around the cutting path in which the laser beam impinging zone moves during a series of operations between the stop and restart of laser beam impingement, the total cutting time is reduced, melting faults do not occur, and high cutting quality is attained.

Also, when movement is resumed after it has been stopped for a desired period of time at any point during a series of operations between the stopping and restart of laser beam impingement, natural heat dissipation causes the workpiece to cool during the stopping time, whereby, in spite of the longer cutting time required, melting faults are readily prevented at a low cost while high cutting quality is attained.

Further, when movement is resumed after it has been stopped temporarily at any point during a series of operations between the stopping and restarting of laser beam impingement and an assist gas is sprayed at a stopping point in the path for a desired period of time at a desired pressure, the effect of cooling the workpiece is accelerated, whereby the overall operation is easy, cutting time is reduced, and, further, melting faults are surely prevented and high cutting quality is attained.

It will also be apparent that the fifth embodiment achieves laser cutting by concentrating a laser beam on a workpiece and utilizing laser energy from the beam to cut the workpiece in a zigzag pattern, wherein when the distance between vertices of adjacent corners in the longitudinal direction of the zigzag pattern and the distance between the vertices of corners in a direction perpendicular to the longitudinal direction of the zigzag pattern are generally 40 mm or more, continuous-wave output is used as a cutting condition to cut up to the vertex of the corner, the cutting condition is changed to pulse output at the vertex of the corner, a given length from the vertex of the corner is then cut using pulse output, the cutting condition is changed to continuous-wave output again, and subsequent cutting is continued, whereby cutting condition changing is carried out once per corner, the distance of cutting under the cutting condition of pulse output is halved accordingly, the continuous-wave output capable of achieving high cutting speed is employed for cutting up to the corner to greatly reduce cutting time, and the continuous-wave output capable of achieving high cut surface quality is used to ensure high quality of the cut surface.

It will further be apparent that the sixth embodiment provides a laser cutting method wherein, when cutting is to be started after the workpiece has been pierced, the impingement of the laser beam is stopped at a piercing position for an optionally set period of time, the impingement of the laser beam is then restarted and maintained, and cutting is started from the piercing position, whereby high cutting quality is provided consistently.

What is claimed is:

1. A method for cutting a workpiece with a laser beam utilizing a plurality of cutting conditions, comprising the steps of:

moving the laser beam so as to impinge upon an impinging zone along a predetermined path to cut a workpiece under first cutting conditions;

stopping impingement of said laser beam upon said impinging zone on said workpiece when said laser beam reaches a predetermined position along said path;

retracting said impinging zone along said predetermined path a predetermined distance from said predetermined position; and resuming impingement of said laser beam upon said impinging zone and moving said laser beam along said predetermined path to cut said workpiece under said second cutting conditions.

2. The method according to claim 1, wherein said path is linear.

3. The method according to claim 1, wherein said path is circular.

4. The method according to claim 1, further comprising the steps of moving said laser beam a predetermined distance upon resuming cutting under said second conditions so as to counter an offset generated during said retracting step.

5. The method according to claim 4, said predetermined distance is approximately a width of a path cut by said laser beam.

6. The method according to claim 1, wherein said distance by which said laser beam is retracted corresponds to a size of a defect which would be produced in said workpiece if said laser beam were not retracted at said position where said first conditions are changed to said second conditions.

7. The method according to claim 1, further comprising the step of spraying a fluid onto said workpiece in the vicinity of said cutting path when said impinging zone is retracted.

8. The method according to claim 7, further comprising the step of setting a pressure and spraying time of said fluid in accordance with the type of material and thickness of said workpiece.

9. The method according to claim 1, further comprising the step of pausing for a predetermined time period between said retracting step and said resuming step.

10. The method according to claim 9, further comprising the step of setting said predetermined time period in accordance with the type of material and thickness of said workpiece.

11. The method according to claim 10, wherein said predetermined time is approximately 2.5 sec for a workpiece 6 mm thick, 4.5 sec for a workpiece 12 mm thick, 6.5 sec for a workpiece 19 mm thick, and 10 sec for a workpiece 22 mm thick.

12. The method according to claim 1, wherein said cutting conditions include at least one of laser power, laser pulse frequency, laser pulse duty cycle, cutting speed, and cutting angle.

13. The method according to claim 12, wherein said predetermined distance is approximately 1.2 mm for a workpiece 6 mm thick, 2.2 mm for a workpiece 12 mm thick, 3.5 for a workpiece 19 mm thick.

14. The method according to claim 1, wherein said workpiece is made of a soft steel material.

15. A method for cutting a workpiece with a laser beam along a zigzag path in which a distance between vertices of adjacent corners in a longitudinal direction of said zigzag path and a distance between vertices of corners in a direction perpendicular to said longitudinal direction are 40 mm, comprising the steps of: applying a laser beam with continuous-wave output as a cutting condition to cut up to a vertex of a first corner; changing said laser beam to pulse output at said vertex of said first corner; cutting a given length of said workpiece from said vertex of said first corner with said laser beam with pulse output; retracting said laser beam a predetermined distance and changing said laser beam back to continuous-wave output for subsequent cutting.

16. A method for cutting a workpiece with a laser beam, comprising the steps of: cutting a workpiece with a laser beam impinging upon an impinging zone along a predetermined path; stopping impingement of said laser beam on said impinging zone at a predetermined position along said path; retracting said impinging zone along said path from said predetermined position a distance determined in accordance with a type of material of said workpiece, a thickness of said workpiece, and a shape of said workpiece; restarting impingement of said laser beam on said impinging zone; and continuing to cut said workpiece along said predetermined path.

17. A laser cutting apparatus having a cutting head for emitting a laser beam and a control unit, said control unit comprising:

means for setting a coordinate system;

means for selecting a cutting condition among a plurality of available cutting conditions;

means for controlling said cutting head to perform a cut in a workpiece by tracing a path along a preprogrammed shape according to a first cutting condition selected by said selecting means;

detecting means for detecting when said tracing has reached a position along said path requiring a cutting condition different from said first cutting condition;

retraction means responsive to said detecting means for pausing said cutting and retracting said tracing a predetermined distance along said path;

resetting means responsive to said retraction means to restart said cutting under a second cutting condition selected from said plurality of cutting conditions.

18. The laser cutting apparatus of claim 17, further comprising:

a nozzle for injecting fluid in the vicinity of the laser beam; and flow adjustment means responsive to said retraction means for adjusting flow conditions of said fluid.

19. The laser cutting apparatus of claim 17, further comprising a dwell timer responsive to said retraction means to set a dwell period prior to said resetting means restarting said cutting.

20. A laser cutting apparatus having a cutting head for emitting a laser beam and a control unit, said control unit preprogrammed to perform the operations comprising:

setting a coordinate system;

selecting a cutting condition among a plurality of available cutting conditions;

controlling said cutting head to perform a cut in a workpiece by tracing a path along a preprogrammed shape according to a first cutting condition selected by said selecting means;

detecting when said tracing has reached a position along said path requiring a cutting condition different from said first cutting condition;

pausing said cutting and retracting said tracing a predetermined distance along said path;

restarting said cutting under a second cutting condition selected from said plurality of cutting conditions.

21. The laser cutting apparatus according to claim 20, wherein said control unit is further programmed to inject fluid in the vicinity of the laser beam, and to adjust flow conditions of said fluid in response to said detecting operation.

22. The laser cutting apparatus of claim 20, wherein said control unit is further programmed to set a dwell period prior to said restarting operation.

* * * * *